Feb. 26, 1924.  1,484,886
F. M. HILL
BRINE CIRCULATING SYSTEM
Original Filed June 6, 1921
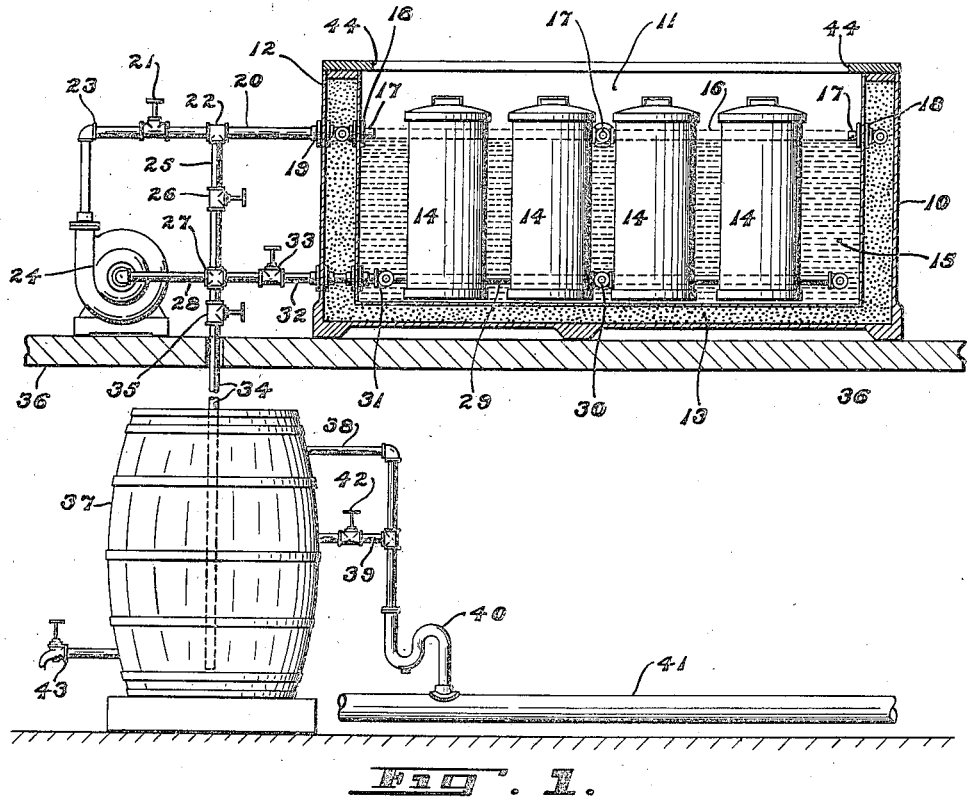
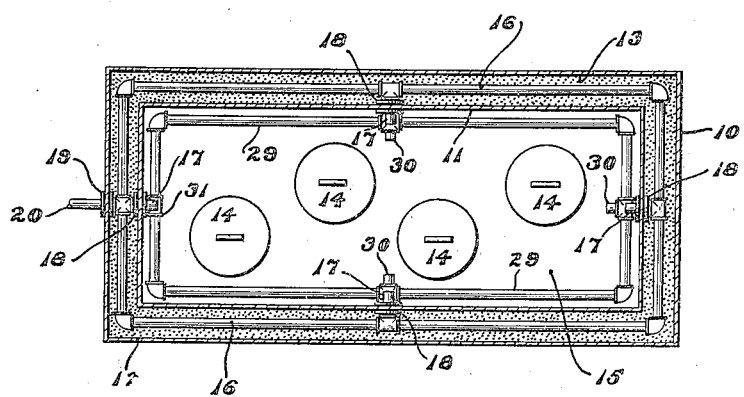
Frank M. Hill.
INVENTOR
BY Victor J. Evans
ATTORNEY
WITNESS:

Patented Feb. 26, 1924.

1,484,886

UNITED STATES PATENT OFFICE.

FRANK M. HILL, OF CAMDEN, NEW JERSEY.

BRINE-CIRCULATING SYSTEM.

Application filed June 6, 1921, Serial No. 475,411. Renewed October 27, 1923.

*To all whom it may concern:*

Be it known that I, FRANK M. HILL, a citizen of the United States, residing at Camden, in the county of Camden and State of New Jersey, have invented new and useful Improvements in Brine-Circulating Systems, of which the following is a specification.

This invention relates to brine systems or apparatus in which brine is employed for effecting the freezing or cooling of foods and liquids whereby they are preserved or rendered more easy for commercial or other handling. More particularly my invention has reference to ice boxes and the like in which quantities of ice cream are kept for dispensing in more or less small quantities. Heretofore ice boxes of the kind referred to have been found very wasteful and have necessitated constant replenishment with fresh brine due to the unsatisfactory means employed for draining away the waste water resulting from heat absorption and the melting of the ice placed in such boxes, said waste water and the like that rises to the upper parts of the ice box being usually drawn off from the bottom of the box and thereby carrying away large quantities of the brine. To overcome the defects discovered in the use of this system I have adopted the process of draining an ice box from the top or near the top of the brine level so that I may by this operation draw off from the freezing brine solution the warmer and less dense portion of the solution while I allow to remain in the box the colder and more dense briny freezing mixture which tends to settle toward the bottom of the box. By doing this I accomplish two distinct desirable results. First I thereby effect a distinct saving and economy in the operation of the box in that I draw off at the top the mixture which contains the least briny element and which is of a temperature giving it a lesser degree of efficiency at that time as a freezing mixture. I also thereby effect this draining in a very convenient manner and from a point of height in reference to the depth of the brine which least disturbs the continued refrigeration of the contents of the box. Second I am by this process enabled to leave remaining in the box a freezing mixture which is of the highest degree of brine constituent and which is of the coldest temperature of the box content as well as leaving remaining in the box any cold salt deposit which may have settled at the bottom thereof from a super-saturated condition of the freezing mixture. It will be found in practice that this process retains the box content at a more even temperature and a colder temperature with less use or waste of brine or briny content than is possible by the use of the process of draining the box from or at the bottom.

The primary object of this invention is to provide what may be succinctly termed a combined gravity waste water overflow and brine circulating system for ice boxes and the like.

Another object of this invention is to provide an ice box having a brine circulating system, intact therewith whereby considerable economy in their use is effected.

A further object of my invention is to provide an ice box of the nature referred to in the preceding paragraph which houses and retains the ice cream cans constantly immersed.

With the foregoing and other objects in view as will hereafter be more apparent my invention consists essentially in providing an ice box with a waste overflow near its upper part and a brine outlet near its lower part in combination with means for shutting off the overflow outlet and circulating the brine therethrough.

In the further disclosure of the invention reference is to be had to the accompanying sheet of drawings constituting a part of this specification and in which like characters of reference designate the same parts in both the views.

Figure 1—is an elevation of my improved brine system as applied to an ordinary commercial ice box; parts being broken away or in section for a better understanding thereof; and, Figure 2—is a sectional plan of the ice box.

Referring to the drawings the numeral 10 designates an ordinary commercial ice box including inner and outer spaced units 11, 12 respectively, and having an interposed filling 13 of appropriate insulation, said ice box 10 being adapted for holding a series of ice cream cans 14 more or less encased by a surrounding mixture of brine and broken ice 15 in the well known manner.

At or near the normal upper level of the brine and ice mixture 15 and conveniently—though not essentially—disposed and securely mounted between the inner and outer units 11, 12 is a surrounding pipe 16 having nozzles 17 projecting through the walls of the inner unit 11, and said pipe 16 is appropriately clamped thereabout by coupling flanges 18 as will be readily understood by those acquainted with the manufacture of such articles. These nozzles 17 serve to drain off the upper strata or film of warmer water arising as the ice melts, and connected into the pipe 16 at 19 is a pipe 20 valved at 21 and secured to a T 22 from which an elbow 23 leads to a circulating pump 24 of appropriate power-driven or manually actuable type. Another or down pipe 25 valved at 26 connects with a four-way union 27 branched by a pipe 28 also to the circulating pump 24.

Conveniently—though not essentially—located at or near the lower part of the inner unit 11 is a surrounding pipe 29 supported in any appropriate manner and provided with nozzles 30 opening into the mixture of brine and ice 15. This pipe 29 is also teed at 31 to a pipe 32 fitted with a shut-off cock 33 and connecting into the aforesaid four-way union 27. A drain pipe 34 valved at 35 conveniently passes through the floor 36 to a brine settling barrel or other suitable receptacle 37 in the cellar or lower regions, said barrel 37 having overflow connections 38, 39 communicating by a siphonic seal or swan-neck 40 with a drain or sewer connection 41. The lower overflow 39 is valved at 42, and the barrel or other suitable receptacle 37 is provided with a faucet or draw-off 43.

From the foregoing it will be obvious that by closing the valve 21 and shut-off cock 33 and leaving the valves 26 and 35 open that the warmer water and admixture of brine therewith arising to the overflow nozzles 17 when the ice box 10 is in use will be carried away or drained down the pipe 25 to the settling barrel 37, and as the latter fills to the upper overflow 38 the brine carried down will settle and keep the lower level of water cold, whilst the warmer upper part may drain away to waste by said pipe 38 to the sewer 41. On the other hand when it is desired to cool the upper portion of the combined ice and brine mixture 15 the valves 26, 35 are closed, whilst the shut-off cock 33 is opened and the circulating pump 24 set in operation which causes the heavier brine mixture from the bottom of the ice box 10 to be drawn through the nozzles 30 and pump 24, and forced through the elbow 23, valve 21, pipe 16 and nozzles 17 over the upper part of the warmer combined mixture of ice and brine, or fresh ice when the ice box has been replenished therewith. Still further it will be seen that when the settling barrel 37 has accumulated a sufficient quantity of heavily charged brine water the same may be easily pumped therefrom by closing the valves 26, 42, and shut-off cock 33 and opening the valves 21 and 35, whereupon said heavily charged brine water can be pumped from the settling barrel 37 to the top of the ice box 10 as will be clearly apparent to those acquainted with the art.

Obviously one or more settling barrels 37 may be employed and connected up in series, and similarly more than one ice box 10 may be connected together and the brine circulated therethrough by one pump 24. Still further I do not limit myself to the use of a pipe overflow or brine circulating pipe as shown as other well known means may be employed, such as channel outlets built into or made a part of the inner unit, check valves may be fitted where necessary to prevent air entering the overflow and brine circulating pipes when the ice box is not in use, or is opened for recharging with fresh ice or brine.

Another feature I wish to mention is the provision of the ice box 10 with an inwardly projecting upper ledge 44 which serves to overlap the edges of the cans 14 and prevent their rising when in use. Still further it is to be remarked that the heavier brine water at the bottom of the settling barrel 37 may be drawn off when desired by the faucet 43 and used as desired and thereby effecting a great saving.

From the foregoing it will also be seen that an economy in brine use is effected due to the high level overflow in that it is a well known fact that brine settles to the lower levels, or in other words, my system ensures what may be termed a brine reclamation.

Whilst I have described and shown one practical embodiment of my invention, I wish it clearly understood that it is not conclusive as numerous changes and other variations thereof can readily be evolved to meet different service conditions, and it is hereby intended to include all such reasonable changes and other modifications as fairly fall within the scope of the appended claims.

Having described my invention, what I claim as new and desire to secure by Letters Patent is:

1. The process herein described, which consists in subjecting material to be cooled to melting ice and salt, drawing off the upper portion of the briny solution thus formed, said upper portion being warmer and less dense than the lower portion, permitting the solution thus drawn off to settle, and mixing the lower, cool and dense portion of the solution drawn off with that portion of the solution not disturbed, the remainder of the solution drawn off being conveyed to a point of discharge.

2. The process herein described, which consists in subjecting material to be cooled to melting ice and salt, drawing off the upper portion of the briny solution thus formed, permitting the solution drawn off to settle, mixing the cooler portion of the solution drawn off with that portion of the solution not disturbed, the remainder of the solution drawn off being conveyed to a point of discharge, and adding refrigerating material in quantity approximately equal to the amount lost incident to the separation subsequent to the settling operation.

In testimony whereof I affix my signature.

FRANK M. HILL.